United States Patent [19]

Small

[11] Patent Number: 4,901,216
[45] Date of Patent: Feb. 13, 1990

[54] POWER SUPPLY REGULATED BY MODULATING THE INDUCTANCE IN A RESONANT LC CIRCUIT

[75] Inventor: Kenneth T. Small, Cupertino, Calif.
[73] Assignee: Boschert Incorporated, Fremont, Calif.
[21] Appl. No.: 258,262
[22] Filed: Oct. 14, 1988

Related U.S. Application Data

[62] Division of Ser. No. 130,906, Dec. 10, 1987.
[51] Int. Cl.$^4$ .................... H02M 7/538; H02M 3/337
[52] U.S. Cl. ........................................ 363/98; 363/17; 363/132
[58] Field of Search ................. 363/16, 17, 80, 98, 363/131, 132

[56] References Cited

U.S. PATENT DOCUMENTS

| | | | |
|---|---|---|---|
| 3,317,812 | 5/1967 | Mesenhimer | 363/17 |
| 3,343,062 | 9/1967 | Mesenhimer | 363/17 |
| 3,460,020 | 8/1969 | Quinn | 363/17 |
| 4,573,184 | 2/1986 | Tanaka et al. | 363/28 |

FOREIGN PATENT DOCUMENTS 773861 10/1980 U.S.S.R. ................................ 363/17

Primary Examiner—William H. Beha, Jr.
Attorney, Agent, or Firm—Skjerven, Morrill, MacPherson, Franklin & Friel

[57] ABSTRACT

A switching power supply includes an output transformer including a primary winding and a secondary winding. The primary winding is coupled to a switching transistor. Of importance, a diode is coupled across the switching transistor. During the time period before the switching transistor turns on, the output transformer draws magnetizing current through the diode, and thus before the transistor turns on, the voltage across the transistor is limited to one diode voltage drop. Thus, the switching losses incurred when the transistor turns on are minimized. In one embodiment, the power supply is a full bridge converter including first and second transistors coupled to one lead of the primary winding, and third and fourth transistors coupled to a second lead of the primary winding. The output voltage of the converter is regulated by regulator circuit which modulates the switching phase of the first and second transistors relative to the third and fourth transistors. The regulator circuit typically comprises a resonating LC circuit including an inductive element and a capacitive element. The on-time of the first and second switching transistors is dependent on the resonant frequency of the LC circuit. The on-time is modulated by varying the inductance of the inductive element in the LC circuit.

11 Claims, 9 Drawing Sheets

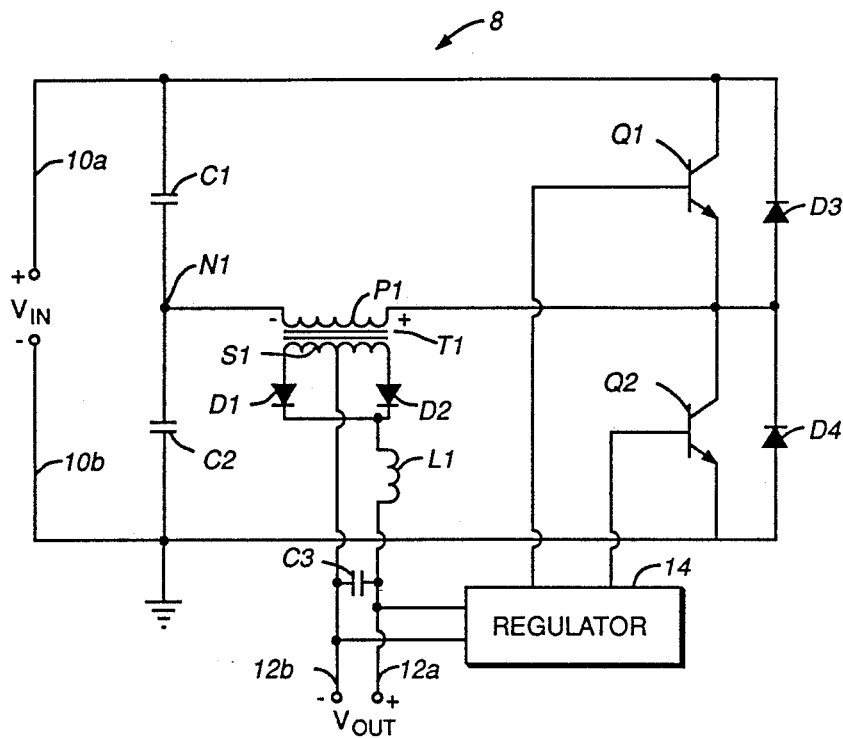
FIG._1
PRIOR ART
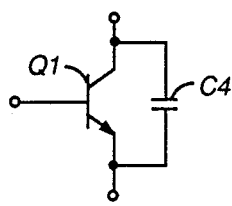
FIG._2

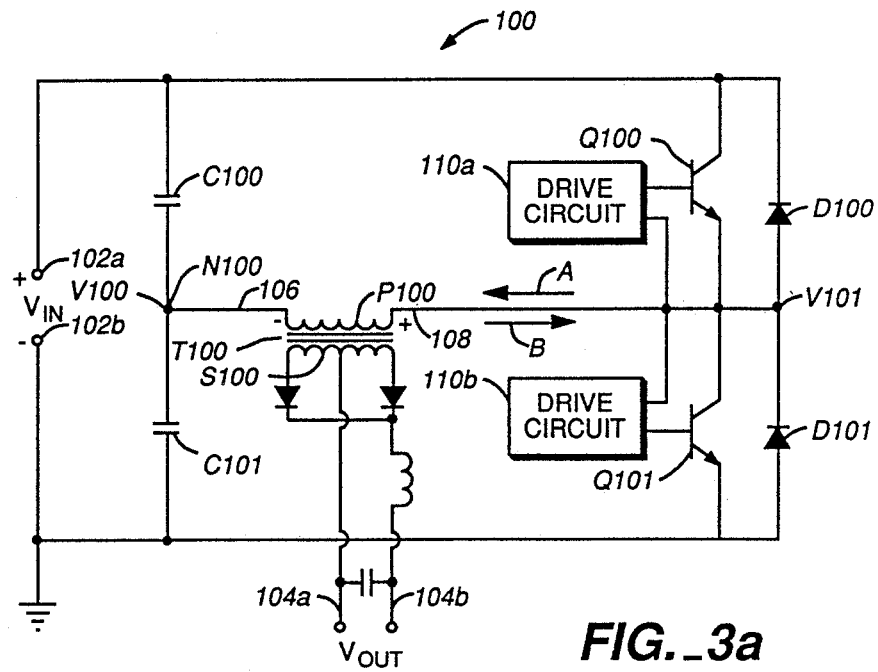
FIG._3a
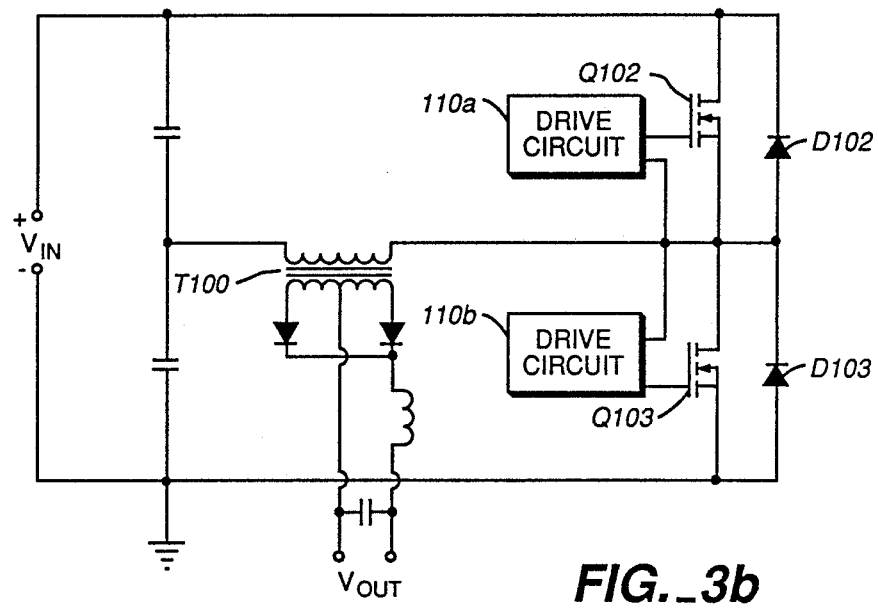
FIG._3b

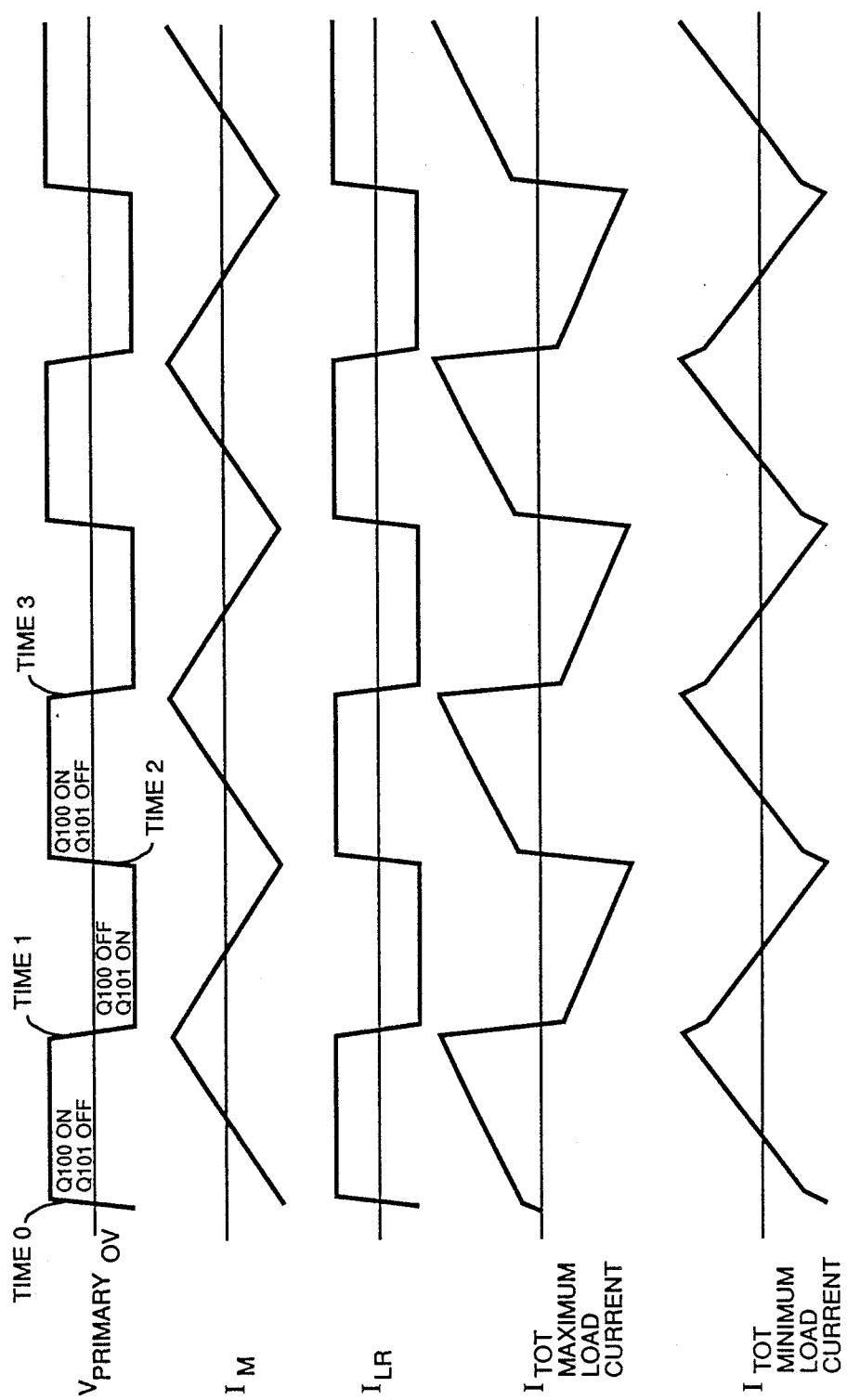
FIG._4

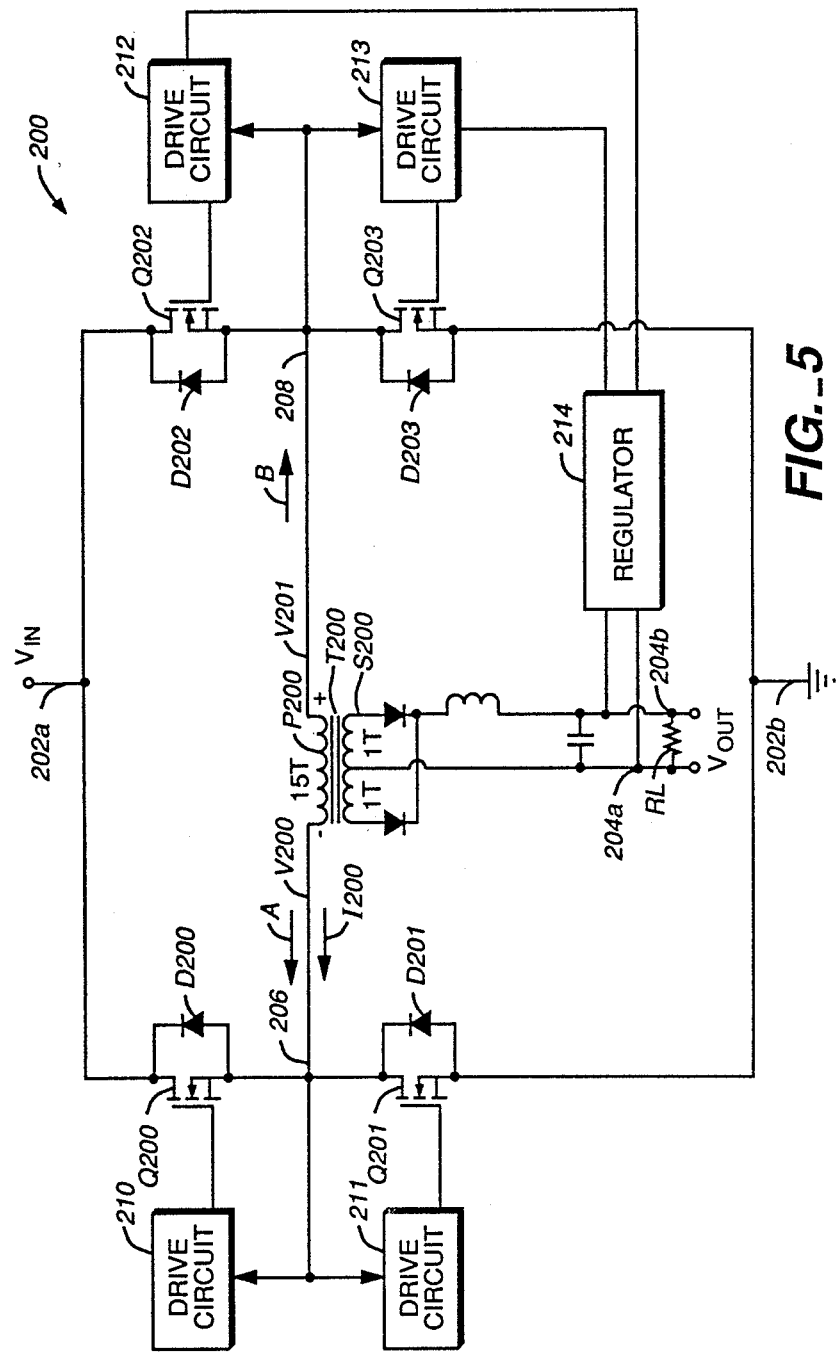
FIG._5

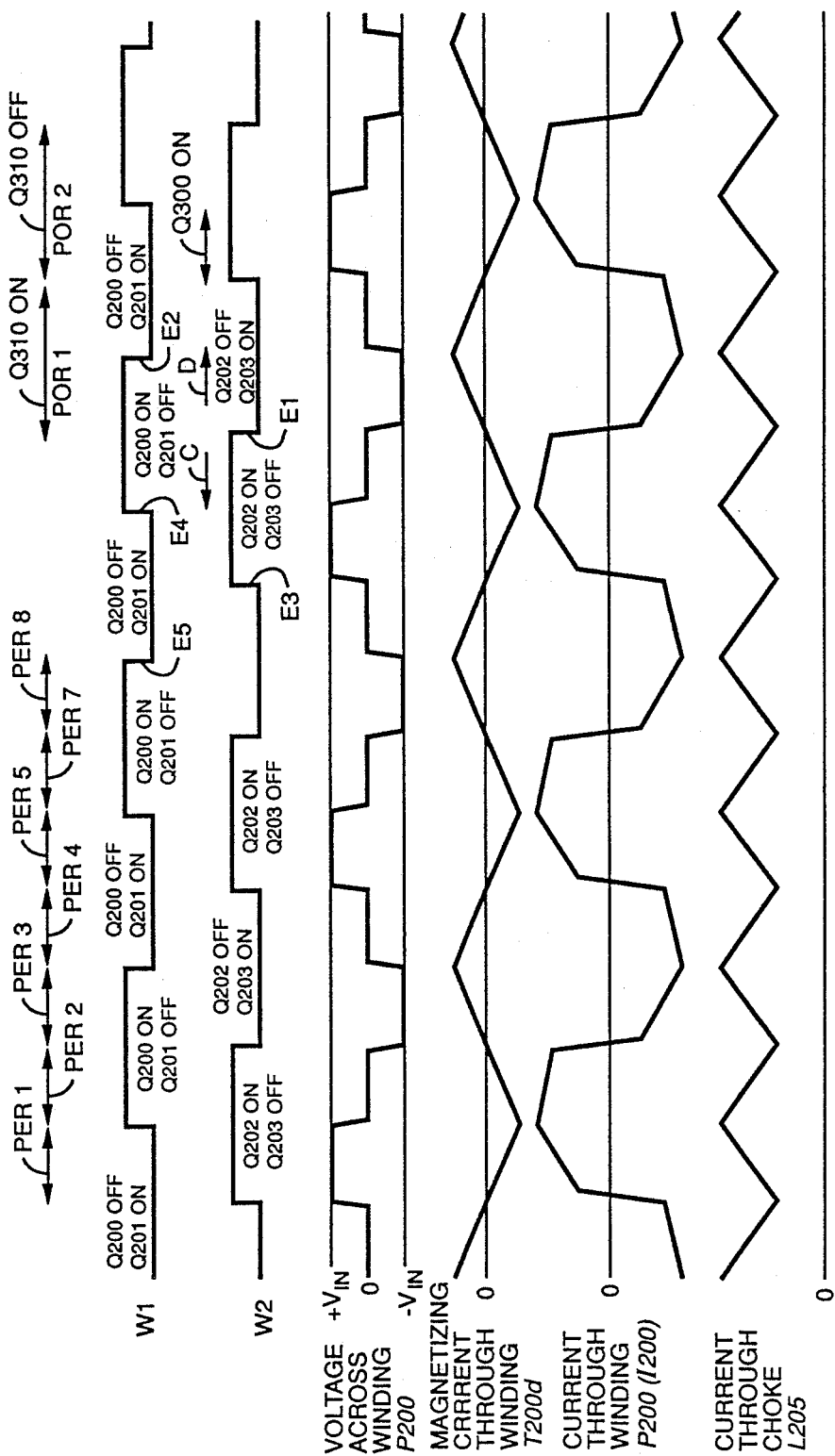
FIG._6

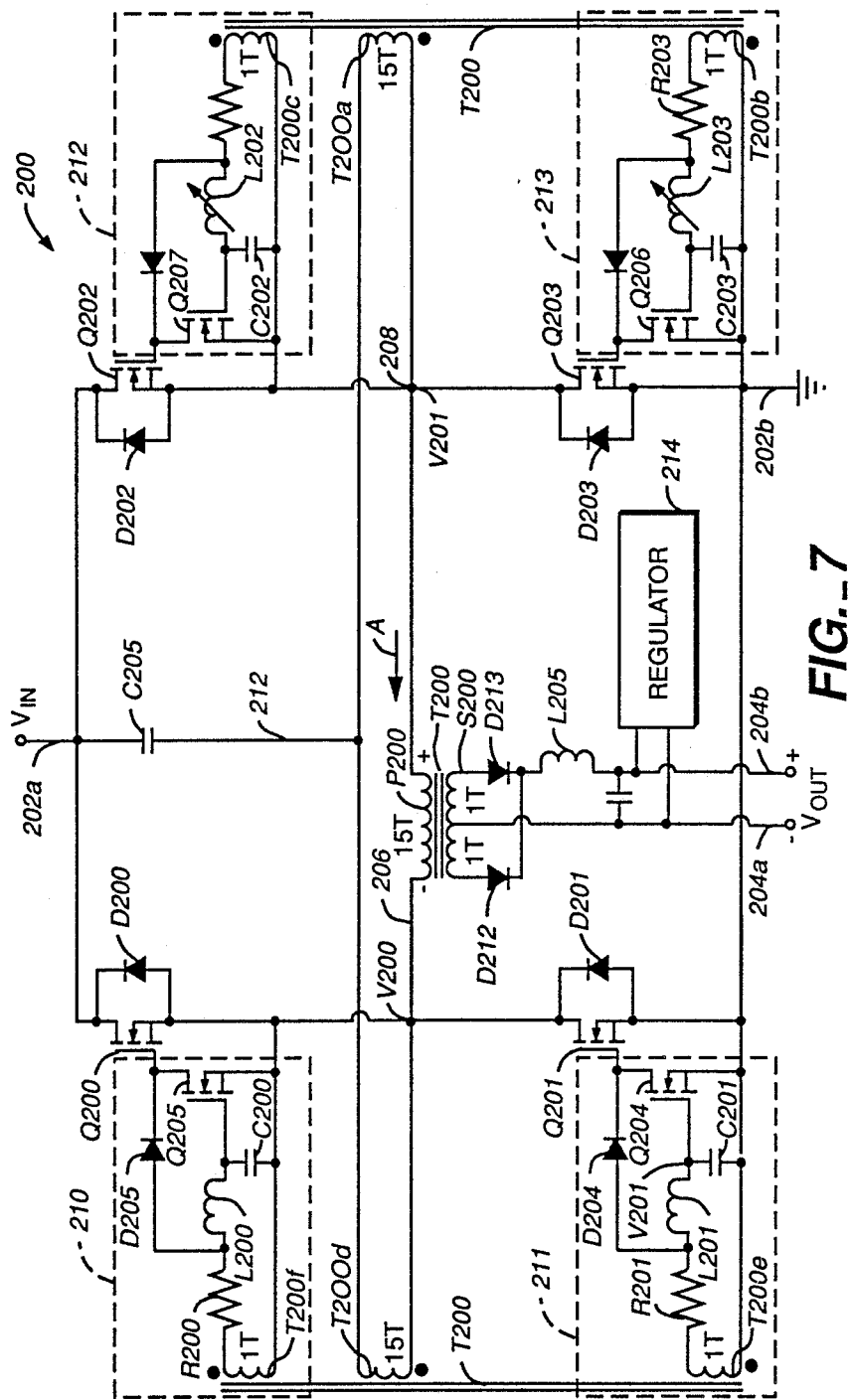
FIG._7

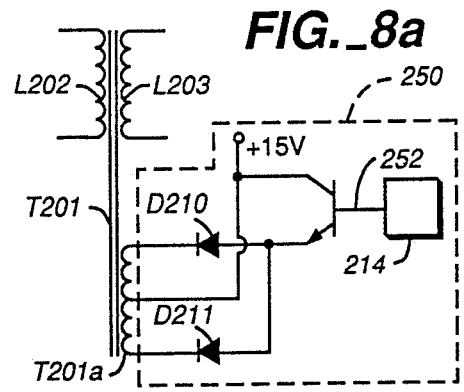
FIG._8a
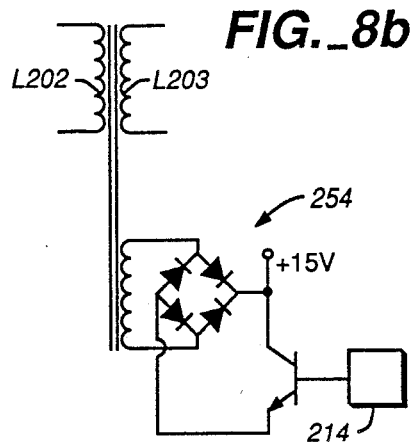
FIG._8b
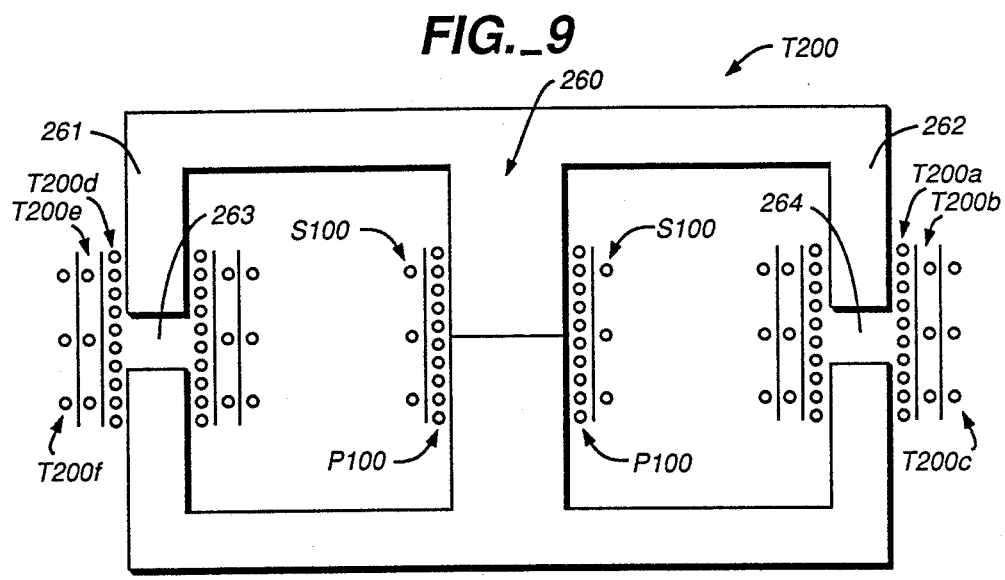
FIG._9
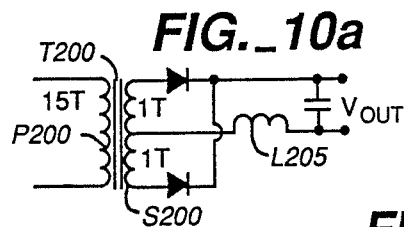
FIG._10a
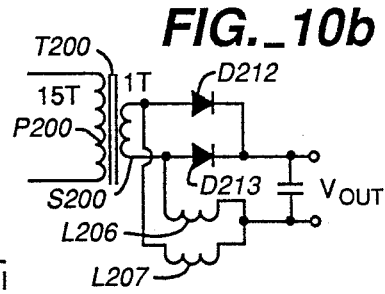
FIG._10b
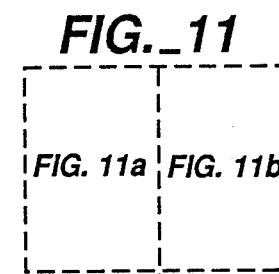
FIG._11

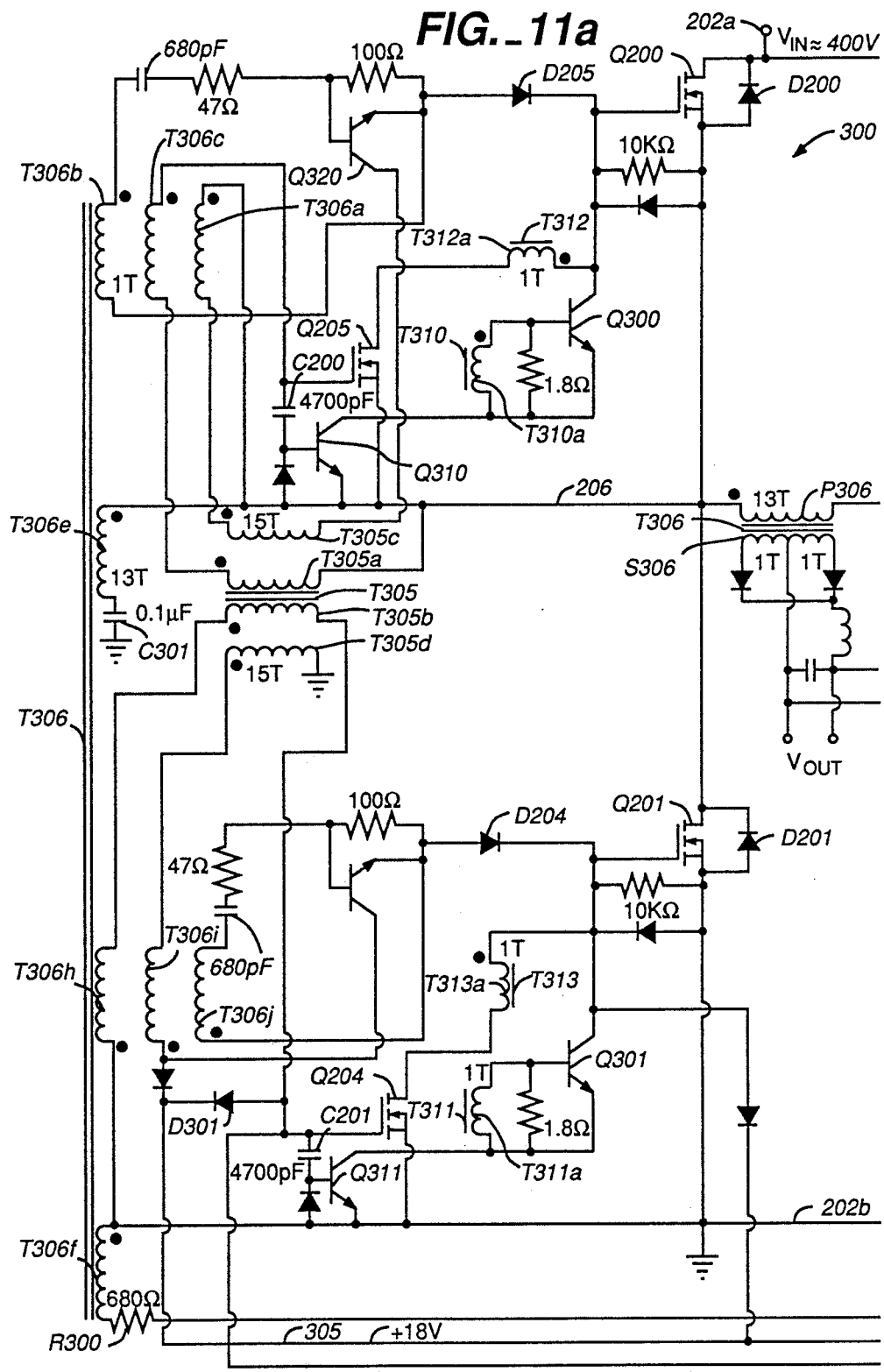
FIG._11a

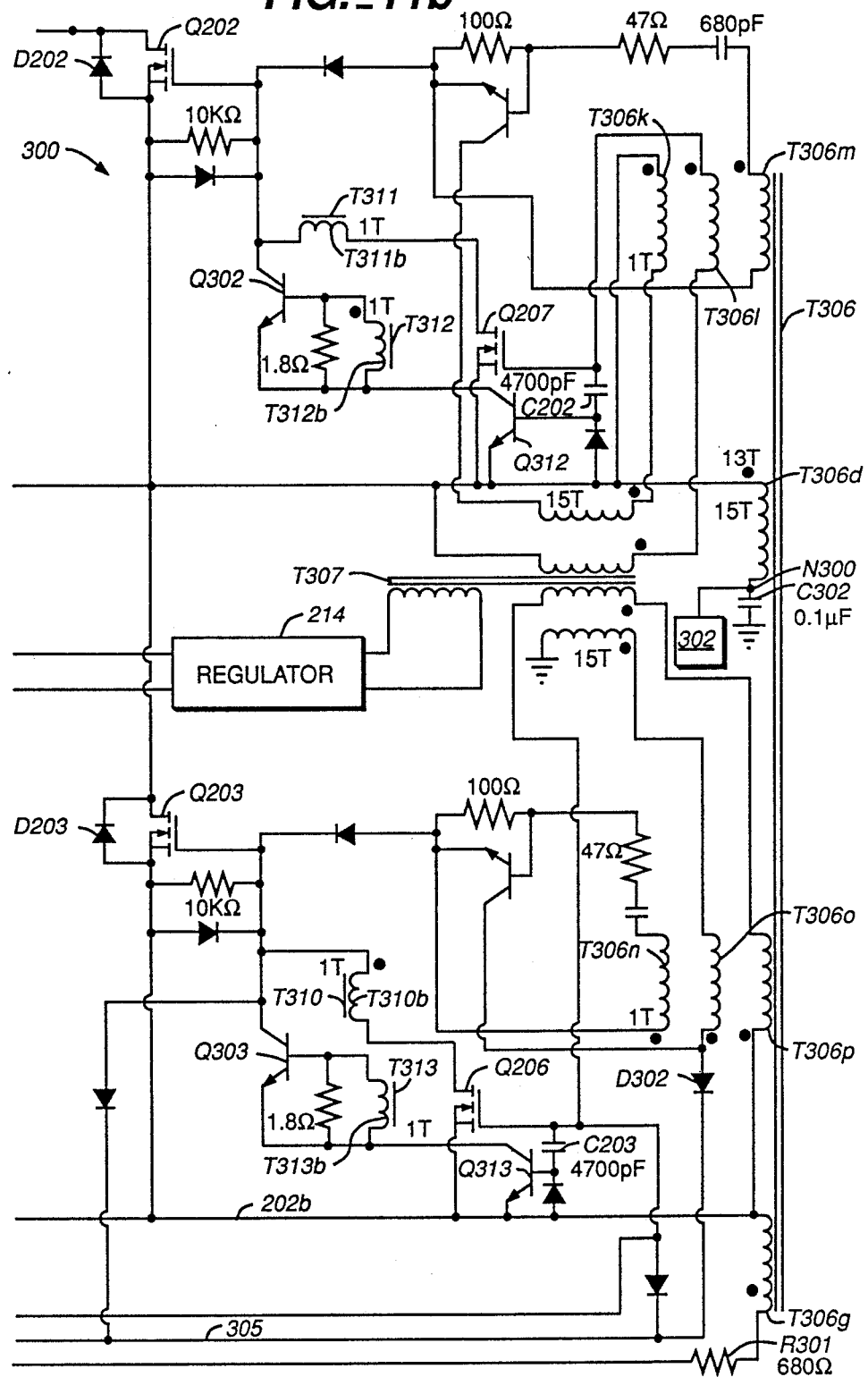
FIG._11b

POWER SUPPLY REGULATED BY MODULATING THE INDUCTANCE IN A RESONANT LC CIRCUIT

This application is a division of application Ser. No. 07/130,906 filed 12/10/87.

BACKGROUND OF THE INVENTION

1. Field of the Invention

This invention relates to switching power supplies and more specifically to switching power supplies with reduced switching losses at high frequencies.

2. Prior Art

FIG. 1 illustrates a typical prior art half-bridge switching power supply 8 which receives a DC input voltage $V_{in}$ across a pair of terminals 10a and 10b and generates therefrom a DC output voltage $V_{out}$ across a pair of output terminals 12a and 12b.

Power supply 8 includes capacitors C1 and C2, which function as a capacitive voltage divider so that the voltage at a node N1 is approximately equal to voltage $V_{in}/2$. Power supply 8 also includes first and second switching transistors Q1 and Q2 which periodically turn on and off such that when transistor Q1 is on, transistor Q2 is off, and when transistor Q2 is on, transistor Q1 is off. Transistors Q1 and Q2 typically have equal duty cycles. When transistor Q1 is on, a voltage of approximately $V_{in}/2$ (the voltage at lead 10a minus the voltage at node N1) is applied across primary winding P1 of transformer T1. When transistor Q2 is on, the voltage across winding P1 equals $-V_{in}/2$ (the voltage at lead 10b minus the voltage at node N1). Voltage $V_{out}$ is generated in response to the waveform applied to winding P1 by a conventional filter and rectifier circuit comprising diodes D1 and D2, inductor L1 and capacitor C3 coupled to a secondary winding S1. A regulator circuit 14 senses voltage $V_{out}$ and increases the duty cycle of transistors Q1 and Q2 if voltage $V_{out}$ is too low, and decreases the duty cycle of transistors Q1 and Q2 if voltage $V_{out}$ is too high.

Diodes D3 and D4 are coupled across transistors Q1 and Q2, respectively to prevent large voltage spikes across and current spikes through transistor Q1 when transistor Q2 turns off, and large voltage spikes across and current spikes through transistor Q2 when transistor Q1 turns off.

Unfortunately, each time one of transistors Q1 and Q2 turns on and then turns off, power supply 8 consumes an amount of power known as a switching loss. As the switching frequency of transistors Q1 and Q2 increases, the amount of energy loss per unit time exhibited by power supply 8 increases, thereby making power supply 8 less efficient.

The switching loss incurred by power supply 8 is caused in part by the fact that transistors such as Q1 and Q2 exhibit capacitance across the collector and emitter. Thus, transistor Q1 can be modeled as illustrated in FIG. 2, with a capacitor C4 coupled across the collector and emitter. When transistors Q1 and Q2 are off, a voltage equal to approximately $V_{in}/2$ is applied across the collector and emitter of transistor Q1. Therefore, an amount of energy is stored in capacitor C4 equal to $C(V_{in}/2)^2/2$, where C is the capacitance of capacitor C4. When transistor Q1 turns on, capacitor C4 is discharged through transistor Q1, and all of the energy stored in capacitor C4 is dissipated in transistor Q1. Thus, every switching cycle, an amount of energy equal to $C(V_{in}/2)^2/2$ is wasted by turning on transistor Q1 and by turning on transistor Q2. It would be desirable to eliminate this switching loss.

It is also known to use MOS transistors in switching power supplies, and that MOS transistors can be operated at higher frequencies than bipolar transistors, e.g. frequencies greater than 1 MHz. However, such MOS transistors exhibit capacitance across the source and drain, and therefore incur a switching loss similar to the loss described in reference to FIG. 2. At high frequencies, these switching losses, which are proportional to frequency, become so great that the power supply cannot operate efficiently.

Other types of power supplies include full bridge converters and push-pull converters, described, for example, by Chryssis in a book entitled "High-Frequency Switching Power Supplies", published by McGraw-Hill Book Company in 1984, incorporated herein by reference. Such switching power supplies also exhibit the above-described switching losses.

SUMMARY OF THE INVENTION

A switching power supply constructed in accordance with one embodiment of my invention comprises means for ensuring that when switching transistors within the power supply are about to turn on, the voltage across the switching transistors is brought to approximately zero volts so that the energy losses incurred when the transistors turn on is minimized. In this way, the switching losses exhibited by the power supply are negligible.

In one embodiment of my invention, the power supply comprises a half-bridge converter in which the output transformer exhibits inductance. A diode is coupled across each of the switching transistors in the half-bridge converter. When a first one of the switching transistors turns off, the transformer continues to draw magnetizing current and leakage inductance current which flows through the diode coupled across the second switching transistor. (Magnetizing current is the current through a winding which results in or is caused by magnetic flux in a core. Leakage inductance current results in or is caused by magnetic flux which passes outside of the core.) Because of this, the diode coupled across the second transistor turns on, and the voltage across the second transistor is approximately one diode voltage drop (about 0.7 volts). In accordance with one novel feature of my invention, the second transistor is turned on when the diode across the second transistor is on. Thus, the switching loss incurred when the second transistor turns on is negligible.

In one embodiment of my invention, a drive circuit provides base current for the second transistor in response to the voltage at the node between the first and second transistors to ensure that a negligible voltage is present across the second transistor when the second transistor turns on. A similar drive circuit drives the first transistor to minimize switching losses.

In another embodiment of my invention, the power supply comprises a full-bridge converter having first and second switching transistors coupled to one lead of a primary winding of an inductive output transformer and third and fourth switching transistors coupled to the other lead of the primary winding. The switching transistors are typically MOS transistors. Of importance, a diode is coupled across the first, second, third and fourth transistors. This diode can be either a discrete diode or merely the drain-body PN junction of the transistor. Of importance, before each of the switching transistors turns on, the inductive output transformer pulls current through the diode coupled across that transistor, thereby ensuring that the voltage across each transistor prior to the transistor turning on is negligible, thus minimizing switching losses.

Each transistor operates at a duty cycle of about 50%. The switching of the first transistor is 180° out of phase with the switching of the second transistor, and the switching of the third transistor is 180° out of phase with the switching of the fourth transistor. The output voltage of the power supply is regulated by modulating the phase of the first and second transistors relative to the phase of the third and fourth transistors.

BRIEF DESCRIPTION OF THE DRAWINGS

FIG. 1 schematically illustrates a half-bridge power supply constructed in accordance with the prior art.

FIG. 2 schematically models transistor Q1 of FIG. 1.

FIGS. 3a and 3b illustrate half-bridge converters constructed in accordance with my invention.

FIG. 4 is a timing diagram illustrating various signals within the half-bridge converter of FIG. 3a.

FIG. 5 is a simplified schematic drawing of a full-bridge converter constructed in accordance with my invention.

FIG. 6 is a timing diagram illustrating the timing for various signals within the converter of FIG. 5.

FIG. 7 illustrates in more detail the full-bridge converter of FIG. 5.

FIGS. 8a and 8b illustrate variable inductive elements for phase modulating the converter of FIG. 7.

FIG. 9 illustrates a transformer for use in the converter of FIG. 7.

FIGS. 10a and 10b schematically illustrate alternative output circuits used in conjunction with the converter of FIG. 7.

FIGS. 11a and 11b illustrate a detailed schematic diagram of a full-bridge converter constructed in accordance with another embodiment of my invention.

FIG. 11 illustrates the manner in which FIGS. 11a and 11b are to be placed relative to one another.

DETAILED DESCRIPTION

Half-Bridge Embodiment

FIG. 3a illustrates a half-bridge converter 100 constructed in accordance with one embodiment of my invention. Referring to FIG. 3a, converter 100 includes first and second leads 102a and 102b for receiving input voltage $V_{in}$ and a pair of output leads 104a and 104b for providing therefrom output voltage $V_{out}$. A capacitive voltage divider comprising capacitors C100 and C101 is coupled between leads 102a and 102b. The voltage at a node N100 between capacitors C100 and C101 is held by the capacitive voltage divider at a voltage of about $V_{in}/2$. A pair of transistors Q100 and Q101 are periodically turned on and off by drive circuits 110a and 110b, respectively, such that when transistor Q100 is on, transistor Q101 is off and when transistor Q101 is on, transistor Q100 is off. Transistors Q1 and Q2 each operate at a duty cycle of about 50%. When transistor Q100 is on, current flows from lead 102a, through transistor Q100, a primary winding P100 of an inductive transformer T100 and through capacitors C100 and C101. When transistor Q101 is on, current flows from capacitors C100 and C101, through primary winding P100 and through transistor Q101.

Of importance, a diode D100 is coupled across transistor Q100, and a diode D101 is coupled across transistor Q101. Diodes D100 and D101 cooperate with drive circuits 110a and 110b to reduce the switching losses incurred by switching transistors Q100 and Q101. To more clearly explain why this is so, reference is made to the timing diagram of FIG. 4. Referring to FIG. 4, between times TIME0 and TIME1, transistor Q100 is on, and current $I_{TOT}$ flows from lead 102a, through transistor Q100, through winding P100, and through capacitors C100 and C101. Current $I_{TOT}$ has two components: reflected load current $I_{LR}$ and magnetization current $I_M$. At time TIME1, drive circuit 110a turns off transistor Q100, and current $I_{TOT}$ drops. Because of the inductance exhibited by transformer T100, when transistor Q100 turns off, primary winding P100 continues to draw magnetizing and leakage inductance current, flowing in the direction of arrow A, and the total current $I_{TOT}$ through winding P100 continues to flow through winding P100 in direction A. However, current $I_{TOT}$ is no longer permitted to flow through transistor Q100 and, therefore, transformer T100 draws current out of diode D101, and voltage V101 across transistor Q101 drops to approximately ground minus one diode drop (or approximately ground).

Drive circuit 110b senses voltage V101, and as soon as voltage V101 drops to ground, circuit 110b turns on transistor Q101 for a fixed time period, i.e. the period between TIME1 and TIME2. However, when transistor Q101 turns on, voltage V101 (the voltage across transistor Q101) is essentially zero volts. Therefore, almost no energy is stored in the parasitic capacitor across the collector and emitter of transistor Q101 and no switching loss is incurred by turning on transistor Q101. Between the time transistor Q100 turns off (TIME1) and the time transistor Q101 turns off (TIME2), the voltage applied to lead 106 of winding P100 equals approximately $V_{in}/2$ and the voltage applied to lead 108 of winding P100 is about zero volts. Thus, magnetization current component $I_M$ of current $I_{TOT}$ through winding P100 in direction A decreases linearly with time, eventually becoming negative, i.e. flowing in direction B. In addition, when transistor Q101 is on, reflected load current $I_{LR}$ also flows in direction B. Thus, after transistor Q101 turns on, total current $I_{TOT}$ starts to flow in direction B. When transistor Q101 turns off, current through inductive transformer T100 cannot change instantaneously, and therefore current $I_{TOT}$ flows through diode D100. When that happens, voltage V101 at lead 108 is equal to approximately voltage $V_{in}$ plus one diode drop or essentially voltage $V_{in}$. Drive circuit 110a senses the voltage at lead 110a and turns on transistor Q100 just as diode D100 begins to conduct and holds transistor Q100 on for a fixed time period in response thereto. (The on-time of transistor Q100 equals the on-time of transistor Q101.) Current through winding P100 switches direction during the time in which transistor Q100 is on. At time TIME3, transistor Q100 turns off, and the cycle repeats itself.

One important feature of the above-described converter is that when either transistor Q100 or Q101 turns on, there is approximately no voltage across transistors Q100 or Q101 and therefore almost no switching loss is incurred when transistor Q100 or Q101 turns on.

A certain amount of switching loss is incurred when transistor Q100 or Q101 turns off. This is because transistors Q100 and Q101 cannot turn off instantaneously, and thus some current flows through transistors Q100 and Q101 while the voltage across the transistors increases. This switching loss can be minimized by constructing drive circuits 110a and 110b so that they rapidly pull current out of the bases of transistors Q100 and Q101 during turn-off, respectively, thereby minimizing the switching time during which transistors Q100 and Q101 turn off.

Another feature of the power supply of FIG. 3a is that drive circuits 110a and 110b drive transistors Q100 and Q101 with a fixed on-time. (As used herein, the on-time of transistor Q100 is the time transistor Q100 is on each switching cycle. The on-time of transistor Q101 is similarly the time transistor Q101 is on.) In addition, there is almost no dead time between the time one of transistors Q100, Q101 turns off and the time the other of transistors Q100, Q101 turns on. Thus, drive circuits 110a, 110b are not used to regulate voltage $V_{out}$. Accordingly, if it is desired to regulate output voltage $V_{out}$, some other regulating technique must be used, e.g. regulating input voltage $V_{in}$.

FIG. 3b schematically illustrates a second embodiment of a half-bridge converter. In FIG. 3b, instead of using bipolar switching transistors Q100 and Q101, N channel MOSFETs Q102 and Q103 are used. The circuit of FIG. 3b operates in the same manner as FIG. 3a. Diodes D102 and D103 coupled across transistors Q102 and Q103, respectively, can be discrete elements. In an alternative embodiment, instead of using discrete diodes D102 and D103, the PN junction between the source terminal of transistor Q102 and the drain terminal of transistor Q102 (also known as the drain-body diode of the transistor) can serve as diode D102 while the PN junction between the source terminal of transistor Q103 and the drain of transistor Q103 can serve as diode D103.

Of importance, if drive circuits 110a, 110b are designed to rapidly pull charge off the gates of transistors Q102, Q103, turn off switching losses in transistors Q102, Q103 can be almost eliminated. This is because FETs turn off so rapidly (10 to 20 nanoseconds) that the output capacitance (corresponding to capacitor C4 in FIG. 2) suffices to prevent appreciable voltage increases across the FET until the drain to source channel current has dropped to zero.

Full-Bridge Embodiment

FIG. 5 illustrates a full bridge converter 200 constructed in accordance with my invention. Converter 200 receives voltage $V_{in}$ across terminals 202a and 202b and generates therefrom an output voltage $V_{out}$ across terminals 204a and 204b, respectively. Converter 200 includes switching transistors Q200 and Q201 for coupling lead 206 of primary winding P200 of output transformer T200 to receive either voltage $V_{in}$ or ground, respectively, while switching transistors Q202 and Q203 selectively couple lead 208 to receive either voltage $V_{in}$ or ground, respectively. Of importance, only one of transistors Q200 and Q201 is on at a time and there is approximately no dead time in which both transistors Q200 and Q201 are both off. Similarly, only one of transistors Q202 and Q203 is on at a time, and there is approximately no dead time in which both transistors Q202 and Q203 are off. Transistors Q200 to Q203 are controlled by drive circuits 210 to 213, respectively, to operate at a duty cycle of about 50%. To better understand how converter 200 functions, reference is made to the timing diagram of FIG. 6.

Referring to FIG. 6, during a first time period PER1, transistors Q200 and Q203 are off while transistors Q201 and Q202 are on. During this time period, lead 206 is coupled to ground, lead 208 is coupled to lead 202a, voltage $V_{in}$ is applied across primary winding P200 of transformer T200, and current I200 flows from lead 202a, through transistor Q202, winding P200, transistor Q201, and to ground.

At the end of time period PER1 drive circuit 211 turns off transistor Q201. However, current I200 does not drop to zero immediately, and thus, current continues to flow through winding P200 in direction A. Since the current I200 can no longer flow through transistor Q201, current I200 flows through diode D200, thereby turning on diode D200, and causing the voltage at lead 206 to rise to voltage $V_{in}$ plus one diode drop, or approximately voltage $V_{in}$. Drive circuit 210 senses this increase in the voltage at lead 206 and turns on transistor Q200 for a fixed time period in response thereto.

Of importance, when transistor Q200 first turns on, diode D200 is on, only a small voltage is applied across transistor Q200 at turn-on, and thus the switching loss during turn-on is negligible. During time period PER2 (immediately after transistor Q200 turns on), transistors Q200 and Q202 are on, and transistors Q201 and Q203 are off. The voltage at leads 206 and 208 equals $V_{in}$, and zero volts are applied across winding P200. However, because transformer T200 is inductive, current I200 continues to flow through winding P200.

At the end of time period PER2, drive circuit 212 turns off transistor Q202. Since current through winding P200 does not change instantaneously, winding P200 continues to draw current in the direction of arrow A. Since current I200 can no longer be drawn through transistor Q202, current is drawn through diode D203, thereby turning on diode D203, and bringing the voltage at lead 208 to approximately ground. Drive circuit 213 senses this drop in voltage at lead 208 and turns on transistor Q203 for a fixed time period in response thereto. Of importance, the voltage across transistor Q203 during turn-on equals only one diode voltage drop. This voltage drop is negligible, and thus, the switching loss occurring when transistor Q203 turns on is negligible.

During time period PER3, transistors Q200 and Q203 are on, transistors Q201 and Q202 are off, lead 206 is held at voltage $V_{in}$, lead 208 is held at ground, voltage $-V_{in}$ is applied across winding P200, and the current I200 through winding P200 reverses and flows in the direction of arrow B. At the end of period PER3, drive circuit 210 turns off transistor Q200. However, current I200 through winding P200 does not change instantaneously, and therefore winding P200 draws current through diode D201, thereby turning on diode D201 and causing the voltage at lead 206 to drop to approximately zero volts. This drop in voltage is sensed by drive circuit 211, which turns on transistor Q201 for a fixed amount of time in response thereto.

The cycle continues to repeat itself, thereby ensuring that transistors Q200 to Q203 turn on when only a negligible amount of voltage is applied across them. Thus, the switching loss incurred by transistors Q200 to Q203 is minimized.

It is noted that drive circuits 210 to 213 turn on transistors Q200 to Q203, respectively, for fixed time periods, then turn off transistors Q200 to Q203 and wait for the voltage at leads 206 or 208 to change as appropriate.

Regulation of Converter 200

In accordance with one feature of my invention, output voltage $V_{out}$ of converter 200 is regulated by modulating the phase of transistors Q202 and Q203 relative to the phase of transistors Q200 and Q201. To more clearly explain how regulation is accomplished, it is noted that during time period PER1, voltage $V_{in}$ is applied across winding P200. At the end of time period PER1, transistor Q200 turns on and transistor Q201 turns off. At this point in time, lead 206 and lead 208 are each held at voltage $V_{in}$, and therefore zero volts are applied across winding P200. At the end of time period PER2, transistor Q202 turns off and transistor Q203 turns on. Therefore, the voltage at lead 208 is held at ground and voltage $-V_{in}$ is applied across primary winding P200. It is seen that by modulating the phase of transistors Q202 and Q203 relative to the phase of transistors Q200 and Q201, the amount of time zero volts are applied across winding P200 (time periods PER2, PER4, PER6, PER8, etc.) relative to the amount of time voltage $V_{in}$ or $-V_{in}$ is applied across winding P200 (time periods PER1, PER3, PER5, etc.) can be controlled, and therefore the power delivered to a load RL can be controlled. Regulator circuit 214 senses voltage $V_{out}$ across leads 204a and 204b, and modulates the phase of transistors Q202 and Q203 relative to the phase of transistors Q200 and Q201 in a manner described in greater detail below.

If regulator 214 senses that voltage $V_{out}$ is too low, a signal is applied to drive circuits 212 and 213 to temporarily decrease the on-time of transistors Q202 and Q203, thereby pushing the waveform W2 of FIG. 6 in the direction of arrow C relative to waveform W1, and thereby increasing the percentage of time voltage $V_{in}$ or $-V_{in}$ is applied across winding P100 and decreasing the percentage of time zero volts are applied across winding P200. Similarly, if regulator 214 senses that voltage $V_{out}$ is too high, regulator 214 applies a signal to drive circuits 212 and 213 to temporarily increase the on-time of transistors Q202 and Q203, thereby pushing waveform W2 in the direction of arrow D relative to waveform W1, decreasing the percentage of time voltage $V_{in}$ or $-V_{in}$ is applied across winding P200, and reducing the amount of power delivered to load RL.

In FIG. 5, it is noted that the designation 15T appears next to winding P200. Thus, winding P200 has 15 turns. Winding S200 has 2 turns and a center tap between the two turns.

FIG. 7 schematically illustrates a simplified version of the full bridge converter of FIG. 5. As can be seen, transformer T200 includes windings T200a and T200d having first leads coupled to a node 212, which is held at voltage $V_{in}/2$. (The reason node 212 is held at $V_{in}/2$ is described below.) The other leads of windings T200a and T200d are coupled to leads 206 and 208, respectively of primary winding P200. Thus, as leads 206 and 208 are alternately coupled to voltage $V_{in}$ or ground (as transistors Q200 to Q203 open and close), a voltage of $-V_{in}/2$ or $+V_{in}/2$ is applied across windings T200a and T200d. The voltages applied to windings T200a and T200d are used by drive circuits 210 to 213 to drive the gates of transistors Q200 to Q203. To understand the manner in which drive circuits 210 and 211 function, reference is again made to FIG. 6. During period PER2, transistor Q200 is on, voltage $V_{in}$ is applied to lead 206, and a voltage $-V_{in}/2$ is applied across winding T200d. When transistor Q200 turns off, the voltage at lead 206 drops to ground, and a voltage $+V_{in}/2$ is applied across winding T200d. When that happens, because of the magnetic coupling between windings T200d and T200e, the voltage across winding T200e goes from $-V_{in}/30$ to $+V_{in}/30$. (The voltage across winding T200e equals the voltage across winding T200d divided by 15.) This voltage is applied via a resistor R201 and a diode D204 to the gate of transistor Q201, thereby turning on transistor Q201. Capacitor C201 and inductor L201 resonate in response to the voltage provided by winding T200e, and eventually, the voltage V201 at the gate of a turnoff transistor Q204 rises to a value sufficiently high to turn on transistor Q204, thereby connecting the gate of transistor Q201 to ground and turning off transistor Q201.

As can be seen in the timing diagram of FIG. 6, by the time transistor Q201 turns off (at the end of period PER5), transistors Q202 and Q203 have changed state, and the current through winding P200 flows in direction A. As mentioned above, since current through winding P200 cannot change instantaneously, when transistor Q201 turns off, current continues to flow from terminal 202a, through transistor Q202, through winding P200 and through diode D200. When this happens, voltage V200 at lead 206 is pulled to voltage $V_{in}$ plus one diode drop, the voltage across winding T200d goes from approximately $+V_{in}/2$ to $-V_{in}/2$, a voltage of $-V_{in}/30$ is applied across winding T200e, and a voltage of $+V_{in}/30$ is applied across winding T200f. When this happens, the voltage across winding T200f is applied to the gate of transistor Q200 via a resistor R200 and a diode D205, thereby turning on transistor Q200. The voltage across winding T200f is also applied to an LC circuit comprising an inductor L200 and a capacitor C200. Capacitor C200 and inductor L200 resonate in the same manner as capacitor C201 and inductor L201, and therefore the voltage applied to the gate of turn off transistor Q205 eventually increases so that transistor Q205 turns on, thereby turning off transistor Q200. When this happens, winding P200 draws current through diode D201 and the voltage at lead 206 is pulled to ground, causing the voltage at winding T200d to switch polarity. This causes the voltage across windings T200f and T200e to switch polarity, and causes transistor Q201 to turn on. In this way it is seen that the circuit driving the gate of transistors Q200 and Q201 oscillates to periodically turn transistors Q200 and Q201 on and off, in a nonoverlapping manner, at a duty cycle of about 50%. The circuit driving the gates of transistors Q202 and Q203 oscillates in a similar manner.

In one embodiment, inductors L200 and L201 are actually first and second coils of a bifilar winding wound about a second transformer. This has the advantage of requiring one core for inductors L200 and L201 instead of two cores. In addition, by using a common core for inductors L200 and L201, it is assured that the magnetic characteristics of inductors L200 and L201 are matched. This helps to maintain equal on times of transistors Q200 and Q201, thus improving symmetry of the waveforms at lead 206. This is important when obtaining maximum and minimum duty cycle waveforms across winding P200. Similarly, inductors L202 and L203 are two coils of a single bifilar winding of a third transformer.

As described above, it is necessary to be able to adjust the on-time of transistors Q202 and Q203 in order to phase modulate converter 200. In one embodiment, regulator 214 adjusts the phase by adjusting the inductance of inductors L202 and L203 in response to voltage $V_{out}$. One structure for doing this is illustrated in FIG. 8a. Referring to FIG. 8a, it is seen that inductors L202 and L203 are windings of a transformer T201, which also includes a third winding T201a coupled to a clamping circuit 250. Because of the magnetic coupling between winding T201a and windings L202 and L203, when the voltage across windings L202 and L203 increases, the voltage across winding T201a tends to increase. Clamping circuit 250 is constructed to clamp the voltage across winding T201a below a value determined by the voltage applied to a lead 252 by regulator circuit 214. By controlling the voltage at lead 252, the amount of time during each switching cycle that an AC short is applied across winding T201a is controlled. (As used herein, winding T201a is AC shorted during time periods in which diodes D210 or D211 turn on, so that a DC voltage is across winding T201a.) Of importance, the inductance exhibited by windings L202 and L203 when winding T201a is AC-shorted (approximately 10 μH) is less than the inductance exhibited by windings L202 and L203 when winding T201a is not AC shorted (approximately 11 μH). Thus, clamp circuit 250 is used to modulate the inductive characteristics of windings L202 and L203, and therefore the on-time of transistors Q202 and Q203. FIG. 8b illustrates an alternative clamp circuit 254 for controlling the inductive characteristics of windings L202 and L203.

As mentioned above, a voltage of about $+V_{in}/2$ is present at node 212 (FIG. 7). The reason for this is that during half of each switching cycle, voltage $V_{in}$ is applied to lead 206 and during the other half of each switching cycle, lead 206 is coupled to ground. Similarly, during half of each switching cycle, lead 208 is held at $V_{in}$ and during the other half of each switching cycle lead 208 is held at ground. Capacitor C205 integrates the current flowing through windings T200d and T200a so that the voltage at lead 212 is $V_{in}/2$.

It is noted that when the phase of transistors Q202 and Q203 is adjusted so that most of the time zero volts are applied across winding P200 (i.e. to reduce the amount of power delivered to load RL), very little magnetizing current flows through winding P200. In order to ensure that during each switching cycle, current is drawn through diodes D200 and D201 so that lead 206 is pulled to ground or voltage $V_{in}$, and to ensure that transistors Q200 and Q201 switch properly, winding T200d draws current through diodes D200 when transistor Q201 turns off, and current through diode D201 when transistor Q200 turns off. This causes the voltage at lead 206 to rise to $V_{in}$ or drop to ground, as appropriate, thereby ensuring that windings T200e and T200f turn on transistors Q200 and Q201, respectively. The current drawn by winding T200a similarly ensures that lead 208 is coupled to voltage $V_{in}$ or ground when converter 200 is operated at a low duty cycle.

The magnetizing current through winding T200d is illustrated in FIG. 6. The magnetizing current through winding T200a is similar to the magnetizing current through winding T200d, except phase shifted. Of importance, the current through windings T200a and T200d is independent of load current.

FIG. 9 illustrates one embodiment of transformer T200. As can be seen, transformer T200 includes a center leg 260 and two outer legs 261, 262. Primary winding P200 and secondary winding S200 are wound around center leg 260, windings T200a, T200b and T200c are wound around outer leg 261, while windings T200d, T200e and T200f are wound around leg 262. Of importance, by providing windings T200a to T200f, P200 and S200 around a single transformer, the number of separate parts used to build converter 200 and the size and cost of converter 200 are minimized. In addition, in another embodiment, auxiliary output voltage waveforms may be provided by additional windings (not shown) around legs 261 and 262. These additional windings may be advantageously utilized to provide square wave voltages that are independent of modulation control of voltage $V_{out}$.

As can be seen in FIG. 9, legs 261 and 262 include air gaps 263 and 264, respectively, which are typically 0.1 inches wide. This reduces the inductance of windings T200a and T200d, so that windings T200a and T200d draw more inductive current than would be drawn if there were no air gaps. This is done to ensure that when converter 200 operates to deliver minimal power to load RL, the inductive current through winding T200d will be sufficient to turn on diodes D200 and D201, and the inductive current through winding T200a will be sufficient to turn on diodes D202 and D203.

FIGS. 10a and 10b illustrate alternative output circuits for coupling to the secondary winding of transformer T200. In FIG. 10a, instead of coupling output choke L205 to output diodes D212 and D213 as illustrated in FIG. 7, in FIG. 10a, choke L205 is coupled to the center tap of secondary winding S200. The circuit of FIG. 10a functions in a manner identical to the output circuit of FIG. 7.

In FIG. 10b, the center tap of secondary winding S200 of transformer T200 is eliminated, and each lead of secondary winding S200 is coupled to one of diodes D212, D213 and one of chokes L206, L207. The output circuit of FIG. 10b rectifies the signal provided at winding S200 to provide D.C. voltage $V_{out}$.

In another variation of the output circuit of the present invention, instead of constructing secondary winding S200 so that it includes a one-turn winding on each side of the center tap, in an alternative embodiment, winding S200 includes a ½-turn winding on each side of the center tap. By using a ½-turn instead of a full turn on each side of the center tap, leakage between the primary and secondary windings is minimized.

Of importance, the presence of air gaps 263 and 264 in outer legs 261 and 262 facilitate the use of ½-turn windings because if gaps 263 and 264 were not present and ½-turn windings were used, a flux imbalance would build up in transformer T200, thereby causing transformer T200 to saturate.

Embodiment of FIGS. 11a and 11b

As mentioned above, when adjusting the phase of transistors Q202 and Q203 (FIG. 5) to decrease output voltage $V_{out}$, the phase of transistors Q202 and Q203 is shifted in the direction of arrow D (FIG. 6), to thereby increase the percentage of time that zero volts are applied across winding P200. Thus, regulator 214 pushes edge E1 of waveform W2 toward edge E2 of waveform W1. Of importance, it is necessary to ensure that regulator 214 does not push edge E1 past edge E2. It is also necessary to ensure that regulator 214 does not push edge E3 in direction D past edge E4. If there were no means for ensuring that edges E1 and E3 could not be pushed past edges E2 and E4, respectively, and if voltage $V_{out}$ were consistently too high, regulator 214 would continue to push edge E1 past edge E2, and edge E3 past edge E4. Then, instead of further reducing voltage $V_{out}$, voltage $V_{out}$ would start to increase because the duty cycle of converter 200 (i.e. the amount of time $V_{in}$ or $-V_{in}$ is applied across winding P200) would start to increase.

Similarly, when voltage $V_{out}$ is to be increased, it is necessary to ensure that edge E3 is not pushed past edge E5, and edge E1 is not pushed past edge E4. If edge E3 were pushed in the direction of arrow C past edge E5 by regulator 214 as a result of voltage $V_{out}$ being too low, rather than increasing voltage $V_{out}$, regulator 214 would start to reduce voltage $V_{out}$ because the duty cycle of converter 200 would start decreasing. Accordingly, a converter 300 (FIGS. 11a and 11b) in accordance with another embodiment of my invention comprises means for ensuring that edge E1 cannot be pushed past edges E2 or E4, and edge E3 cannot be pushed past edges E4 or E5.

Converter 300 includes added bipolar transistors Q300 and Q310 coupled between the gate of transistor Q200 and lead 206 to ensure that edge E3 cannot be pushed past edge E5, i.e. to ensure that the switching phase of the transistors cannot be adjusted so that transistor Q200 turns off after transistor Q203 turns off. Of importance, a winding T310a of a transformer T310 is coupled across the base-emitter junction of transistor Q300 and a winding T310b of transformer T310 is coupled between the gate of transistor Q203 and turn-off transistor Q206. If turn-off transistor Q206 turns on, thereby coupling the gate of transistor Q203 to ground and turning off transistor Q203, current through winding T310b causes current to flow through winding T310a, thereby turning on transistor Q300. Thus, transistor Q300 is on during a time period when transistor Q203 is turning off (see FIG. 6). Transistor Q310 is controlled by a winding T306c of transformer T306 and is on during a portion POR1 of each switching cycle of transistors Q200 and Q201 but off during a portion POR2 of each switching cycle of transistors Q200 and Q201. If waveform W2 moves in direction C so that edge E3 is pushed toward edge E5, there will be a time period during which both transistors Q300 and Q310 are on, thereby coupling the gate of transistor Q200 to the source of transistor Q200. As edge E3 is pushed closer to edge E5, the period of time in which both transistors Q300 and Q310 are simultaneously on becomes longer and moves closer to edge E5. If regulator 214 attempts to push edge E3 past edge E5 in direction C, the period of time in which both transistors Q300 and Q310 are simultaneously on also moves in direction C to ensure that transistor Q200 turns off simultaneously with or before transistor Q203 turns off, thereby ensuring that edge E3 cannot be pushed past E5.

Transistor Q310 is provided to ensure that if the phase of waveform W2 is moved in the direction of arrow D, and edge E3 is moved toward edge E4, turning off transistor Q203 will not cause transistor Q200 to fail to turn on. Specifically, if edge E3 were moved toward edge E4, then transistor Q200 would have to turn on immediately after transistor Q203 turned off. Transistor Q310 ensures that the turning off of transistor Q203 will not impair the ability of transistor Q200 to turn on.

It is seen that transistors Q301 and Q311 are coupled between the gate of transistor Q201 and ground. Winding T311a of a transformer T311 is coupled across the base-emitter junction of transistor Q301, while winding T311b of transformer T311 is coupled in series with turn-off transistor Q207 (which turns off transistor Q202). Thus, transistors Q301 and Q311 ensure that edge E1 cannot be moved past edge E4 by ensuring that transistor Q201 must turn off at or before the time transistor Q202 turns off. Transistors Q302, Q303, Q312 and Q313 and transformers T312 and T313 similarly limit the amount of phase shifting that can be accomplished by regulator 214.

It is noted that in FIGS. 11a and 11b, instead of using separate inductors L200 and L201, windings T305a and T305b of transformer T305 resonate with capacitors C200 and C201. Transformer T305 also includes windings T305c and T305d used to provide added drive for turning on transistors Q200 and Q201, respectively. Specifically, winding T305c is coupled in series with a winding T306a of transformer T306 across a pulse-generating transistor Q320. Of importance, transistor Q320 provides a turn-on pulse for transistor Q200. A winding T306b is coupled across the base-emitter junction of transistor Q320 to provide a pulse for turning on transistor Q320, which in turn provides a turn-on pulse for transistor Q200. (The turn-on pulse is applied via diode D205 to the gate of transistor Q200. The gate of transistor Q200 is capacitive, and thus stores charge so that a high voltage remains at the gate of transistor Q200 until either turn-off transistor Q205 turns on or transistors Q300 and Q310 are simultaneously on.) A winding T306c is coupled to winding T305a and capacitor C200 to facilitate resonance of coil T305a and capacitor C200 as described above.

The circuitry for turning on transistors Q201 to Q203 is similar to the circuitry for turning on transistor Q200.

In the embodiment of FIGS. 11a and 11b, windings T306d, T306e and P306 perform the same function as windings T200a, T200d and P200, respectively of FIG. 7. Capacitors C301 and C302 of FIGS. 11a and 11b perform the same function as capacitor C205 of FIG. 7. A start-up circuit 302 coupled to the node N300 between winding T300d and capacitor C302 ensures that the voltage at node N300 of FIG. 10b approximates $V_{in}/2$ when operation of power supply 300 starts up. Because node N301 between winding T306e and capacitor C301 is DC coupled to node N300 via windings T306d, P306 and T306e, circuit 302 also ensures that voltage $V_{in}/2$ is present at node N301 at start-up.

Also illustrated in FIGS. 11a and 11b is a bus line 305 held at 18 V coupled to capacitors C201 and C203 via diodes D301 and D302, respectively. Bus line 305 and diodes D301 and D302 ensure that the voltage across the resonant capacitors never becomes excessive, i.e. that the voltage across capacitors C201 and C203 never exceeds 18 V.

Because capacitors C201 and C203 are coupled to capacitors C200 and C202, respectively, via transformers T305 and T307, respectively, bus line 305 and diodes D301 and D302 also limit the voltage across capacitors C200 and C202.

The converter of FIGS. 11a and 11b includes windings T306f and T306g, resistively coupled to turn-off transistors Q206 and Q204, respectively. Without windings T306f and T306g present, I have discovered that if the phase of transistors Q202 and Q203 is adjusted, the phase of transistors Q200 to Q201 tends to follow the phase of transistors Q202 to Q203. Windings T306f and T306g and resistors R300 and R301 reduce this tendency. The reason for this is not well understood.

In one embodiment of my invention, a circuit (not shown) is coupled to the gates of transistors Q201 and Q203 to provide a turn-on pulse during start-up of converter 300.

Converter 300 typically includes an E core similar to the core of transformer T200, with windings T306a to T306c, T306e, T306f, and T306h to T306j wound around a first outer leg, windings P306 and S306 wound around the center leg, and windings T306*d*, T306*g*, and T306*k* to T306*p* coupled to the second outer leg.

While the invention has been described with regard to a specific embodiment, those skilled in the art will recognize that changes can be made in form and detail without departing from the spirit and scope of my invention. For example, the present invention can also be practiced in a push-pull converter. This is accomplished by using an inductive output transformer in the push-pull converter and coupling diodes across the switching transistors. In addition, my invention can be practiced using bipolar or MOS transistors or other appropriate switching devices. Accordingly, all such changes come within my invention.

I claim:
1. A full-bridge converter comprising:
  a first lead for receiving a first voltage;
  a second lead for receiving a second voltage;
  a first switch coupled between said first lead and a first node;
  a second switch coupled between said first node and said second lead;
  a third switch coupled between said first lead and a second node;
  a fourth switch coupled between said second node and said second lead;
  transformer and current drawing means having a primary winding coupled between said first and second nodes and a secondary winding, said transformer and current drawing means also causing the voltage across said first switch to drop when said second switch opens;
  circuit means coupled to said secondary winding for generating an output voltage in response to power delivered by said secondary winding;
  means for ensuring that said first switch closes during a time period in which the voltage across said first switch has dropped; and
  regulator means receiving said output voltage, said regulator means modulating the switching phase of said first and second switches relative to said third and fourth switches to thereby regulate said output voltage.

2. A full-bridge converter comprising:
  a first lead for receiving a first voltage;
  a second lead for receiving a second voltage;
  first transistor means having a first current carrying lead coupled to said first lead and a second current carrying lead coupled to a first node, said first transistor means having a control lead;
  second transistor means having a first current carrying lead coupled to said first node and a second current carrying lead coupled to said second lead, said second transistor means having a control lead;
  third transistor means having a first current carrying lead coupled to said first lead and a second current carrying lead coupled to a second node, said third transistor means having a control lead;
  fourth transistor means having a first current carrying lead coupled to said second node and a second current carrying lead coupled to said second lead, said fourth transistor means having a control lead;
  a transformer having a primary winding coupled between said first and second nodes and a secondary winding;
  means coupled to said secondary winding for generating an output voltage in response to power delivered by said secondary winding;
  modulation means coupled to said means for generating for modulating said output voltage, said modulation means controlling the switching phase of said first and second transistor means relative to said third and fourth transistor means in response to said output voltage, wherein said modulation means comprises means for adjusting the on-time of said first and second transistor means, said converter further comprising means for preventing the difference in switching phase between said first and second transistor means relative to said third and fourth transistor means from being adjusted to a value greater than 180° or less than 0°, wherein said means for preventing comprises:
  a third node for receiving a voltage which, if applied to the control lead of said first transistor means, turns off said first transistor means;
  means for providing a signal indicative of said fourth transistor means turning off;
  means for coupling said third node to said control lead of said first transistor means if said signal is provided during a predetermined time period after said first transistor means turns on.

3. A full-bridge converter comprising:
  a first lead for receiving a first voltage;
  a second lead for receiving a second voltage;
  a first switch coupled between said first lead and a first node;
  a second switch coupled between said first node and said second lead;
  a third switch coupled between said first lead and a second node;
  a fourth switch coupled between said second node and said second lead;
  transformer and current drawing means having a primary winding coupled between said first and second nodes and a secondary winding, said transformer and current drawing means also causing the voltage across said first switch to drop when said second switch opens;
  circuit means coupled to said secondary winding for generating an output voltage in response to power delivered by said secondary winding;
  means for causing said first switch to close in response to the voltage across said first switch dropping; and
  regulator means receiving said output voltage, said regulator means modulating the switching phase of said first and second switches relative to said third and fourth switches to thereby regulate said output voltage.

4. Full-bridge converter of claim 3 wherein said transformer and current drawing means includes an additional winding pulling current into said first node when said second switch opens.

5. Full-bridge converter of claim 4 wherein said transformer and current drawing means is a transformer in which said primary, secondary and additional windings are wound around a common core.

6. A full-bridge converter comprising:
  a first lead for receiving a first input voltage;
  a second lead for receiving a second input voltage;
  a first switch coupled between said first lead and a first node;
  a second switch coupled between said first node and said second lead;
  a third switch coupled between said first lead and a second node;

a fourth switch coupled beteen said second node and said second lead;

a transformer having a primary winding coupled between said first and second nodes and a secondary winding, said secondary winding delivering power to a load in response to power applied to said primary winding; and modulation means for opening and closing said first, second, third and fourth switches, said modulation means comprising an LC circuit, said LC circuit comprising a resonating inductive element and capacitive element coupled in series, means for applying a voltage waveform across said series-coupled resonating inductive and capacitive elements, and means for turning off said first switch in response to the voltage at the node where said inductive element is coupled to said capacitive element so that the on-time of said first switch is responsive to the resonating frequency of said LC circuit, said modulation means further comprising means for adjusting the inductance of said inductive element.

7. Full-bridge converter of claim 6 wherein said inductive element is an inductor.

8. Full-bridge converter of claim 6 wherein said inductive element is a transformer.

9. A switching power supply comprising:

a first lead for receiving a first voltage;

a transformer having a primary winding including a primary winding lead, said transformer also including a secondary winding for providing output power in response to power delivered to said primary winding;

transistor means having a first current carrying lead coupled to said first lead, a second current carrying lead coupled-to said primary winding lead, and a control lead;

first transistor control means coupled to said control lead for turning on said transistor means by applying a first signal to said control lead;

a switch coupled between said control lead and a second lead;

second transistor control means comprising a resonating LC circuit, said LC circuit comprising a resonating inductive element and capacitive element, said second transistor control means closing said switch, thereby causing the voltage at said second lead to be applied to said control lead and turn off said transistor means, the on-time of said transistor means being responsive to the resonating frequency of said LC circuit; and means for adjusting the inductance of said inductive element to thereby adjust the on-time of said transistor means.

10. A full-bridge converter comprising:

a first lead for receiving a first voltage;

a second lead for receiving a second voltage;

first transistor means having a first current carrying lead coupled to said first lead and a second current carrying lead coupled to a first node, said first transistor means having a control lead;

second transistor means having a first current carrying lead coupled to said first node and a second current carrying lead coupled to said second lead, said second transistor means having a control lead;

third transistor means having a first current carrying lead coupled to said first lead and a second current carrying lead coupled to a second node, said third transistor means having a control lead;

fourth transistor means having a first current carrying lead coupled to said second node and a second current carrying lead coupled to said second lead, said fourth transistor means having a control lead;

a transformer having a primary winding coupled between said first and second nodes and a secondary winding;

means for generating an output voltage in response to power delivered by said secondary winding;

modulation means coupled to said means for generating for modulating said output voltage, said modulation means controlling the switching phase of first and second transistor means relative to said third and fourth transistor means in response to said output voltage, wherein said modulation means comprises means for adjusting the on-time of said first and second transistors, said converter further comprising means for preventing the difference in switching phase between said first and second transistors relative to said third and fourth transistors from being adjusted to value greater than 180° or less than 0°, and wherein said means for preventing comprises:

means for providing a signal indicative of said fourth transistor means turning off;

first switch means closing in response to said signal; and second switch means coupled in series with said first switch means between a third node and said control lead of said first transistor means, said third node receiving a voltage which, if applied to the control lead of said first transistor means, turns off said first transistor means, said second switch closing a predetermined time after said first transistor means turns on, wherein if said first and second switch means are simultaneously closed, said first transistor means turns off.

11. A switching power supply comprising:

a voltage input lead;

transformer and current drawing means having an input winding and an output winding, said input winding having an input winding lead, power being delivered to said output winding in response to power delivered to said input winding;

circuit means coupled to said output winding for generating an output voltage in response to said power delivered to said output winding a switch coupled between said voltage input lead and said input winding lead;

diode means coupled in parallel with said switch for permitting current to flow through said diode means in a first direction but not a second direction; and control means for turning on said switch and controlling the on-time of said switch in response to said output voltage to thereby regulate said output voltage, said transformer and current drawing means drawing current through said diode means during a portion of each switching cycle of said switching power supply, said control means turning on said switch during a time period during which current is being drawn through said diode means, wherein said control means comprises:

an LC resonating circuit, the on-time of said switch being responsive to the resonant frequency of said LC resonating circuit, said LC resonating circuit comprising an inductive element resonating with a capacitive element; and means for adjusting the inductance of said inductive element to thereby modulate the on-time of said switch.

* * * * *